United States Patent
Li et al.

(10) Patent No.: US 10,288,403 B2
(45) Date of Patent: May 14, 2019

(54) SINGLE SENSOR TYPE THREE-DIMENSIONAL MICRO/NANO CONTACT TRIGGER MEASURING PROBE

(71) Applicant: HEFEI UNIVERSITY OF TECHNOLOGY, Hefei, Anhui (CN)

(72) Inventors: Ruijun Li, Anhui (CN); Zhenying Cheng, Anhui (CN); Chen Chen, Anhui (CN); Kuangchao Fan, Hefei (CN)

(73) Assignee: HEFEI UNIVERSITY OF TECHNOLOGY, Hefei, Anhui Province (CN)

(*) Notice: Subject to any disclaimer, the term of this patent is extended or adjusted under 35 U.S.C. 154(b) by 149 days.

(21) Appl. No.: 15/451,772

(22) Filed: Mar. 7, 2017

(65) Prior Publication Data
US 2017/0176162 A1    Jun. 22, 2017

(30) Foreign Application Priority Data
Mar. 7, 2016   (CN) .......................... 2016 1 0128422

(51) Int. Cl.
| | | |
|---|---|---|
| G01D 5/26 | (2006.01) | |
| G01D 5/30 | (2006.01) | |
| G01B 11/00 | (2006.01) | |
| G01B 5/012 | (2006.01) | |
| G01B 5/016 | (2006.01) | |

(52) U.S. Cl.
CPC .............. *G01B 5/016* (2013.01); *G01B 5/012* (2013.01); *G01B 11/007* (2013.01); *G01D 5/26* (2013.01); *G01D 5/30* (2013.01)

(58) Field of Classification Search
CPC .......... G01B 5/016; G01B 5/012; G01B 5/26; G01B 5/30; G01B 11/007
USPC ............................................ 33/503, 556–601
See application file for complete search history.

(56) References Cited

U.S. PATENT DOCUMENTS

| | | | | |
|---|---|---|---|---|
| 5,152,072 A * | 10/1992 | McMurtry | .............. | G01B 5/012 |
| | | | | 33/503 |
| 5,455,677 A * | 10/1995 | Yoshizumi | .............. | G01B 11/00 |
| | | | | 33/561 |
| 5,920,394 A * | 7/1999 | Gelbart | .................... | G01S 17/66 |
| | | | | 356/615 |
| 7,178,253 B2 * | 2/2007 | Ruijl | ...................... | G01B 3/008 |
| | | | | 33/503 |

(Continued)

*Primary Examiner* — Lisa M Caputo
*Assistant Examiner* — Tania C Courson (57) ABSTRACT

A single sensor type three-dimensional micro/nano contact trigger measuring probe is provided which is characterized in respectively providing a probe unit and a measuring unit in the base. In the probe unit, the leaf spring is supported on the circular-ring base, a circular suspension plate is provided on the leaf spring, and beam splitter prisms and wedge block are fixedly provided on the circular suspension plate. The stylus and the circular suspension plate are fixedly connected in a "T" shape. The measuring unit projects the straight light emitted by a laser device through the beam splitter prisms and wedge block and then the straight light is focused on the four-quadrant detector. Measuring the offset of the probe by the four-quadrant detector, in such a manner that single sensor type three-dimensional micrometer contact trigger measurement is achieved.

3 Claims, 5 Drawing Sheets

(56) References Cited

U.S. PATENT DOCUMENTS

| | | | | |
|---|---|---|---|---|
| 7,248,907 B2 * | 7/2007 | Hogan | ............... | A61B 5/0066 356/450 |
| 7,520,067 B2 * | 4/2009 | Yoshizumi | ............ | G01B 5/012 33/559 |
| 7,797,851 B2 * | 9/2010 | Funabashi | ............. | G01B 5/012 33/561 |
| RE42,055 E * | 1/2011 | Raab | ..................... | B25J 18/002 33/1 PT |
| 9,254,164 B2 * | 2/2016 | Woloszko | ......... | A61B 18/1206 |
| 9,383,306 B2 * | 7/2016 | Koerner | ............... | G01N 21/211 |
| 9,452,008 B2 * | 9/2016 | Marion | ................. | A61B 5/01 |
| 2004/0128847 A1 * | 7/2004 | Fracheboud | .......... | G01B 5/012 33/558 |
| 2008/0223117 A1 * | 9/2008 | Watanabe | ............. | B82Y 35/00 73/105 |
| 2010/0011601 A1 * | 1/2010 | Funabashi | ............. | G01B 5/012 33/561 |
| 2013/0050701 A1 * | 2/2013 | Jensen | ................. | G01B 5/012 356/369 |
| 2015/0301079 A1 * | 10/2015 | Humphris | ............. | G01Q 20/02 850/6 |

* cited by examiner

SINGLE SENSOR TYPE THREE-DIMENSIONAL MICRO/NANO CONTACT TRIGGER MEASURING PROBE

CROSS REFERENCE OF RELATED APPLICATION

The present application claims priority under 35 U.S.C. 119(a-d) to CN 201610128422.6, filed Mar. 7, 2016.

BACKGROUND OF THE PRESENT INVENTION

Field of Invention

The present invention relates to the field of micro/nano testing, and more particularly to a contact trigger three-dimensional probe applied to micro/nano coordinate measuring machines (CM Ms) for sensing three-dimensional topography of an object.

Description of Related Arts

In recent years, the rapid development of micro electronic techniques has headed to a miniaturized revolution. In particularly, the development of the processing technique of MEMS (micro electro mechanical system) has brought in various micro-devices including MEMS products such as micro-gears, micro-holes, micro- micro-nozzles and micro-steps. These micro-devices have a micro-nanometer level machining precision, so it is necessary to develop high precision detection method and technical means for precisely measuring the micro-devices. Thus, the relevant agencies of various countries are devoted to researching coordinate measuring machine with nanometer precision.

The probe is a core component for the CMMs. The probe's measurement accuracy determines the overall measurement accuracy of the CMMs. The probe is classified in a contact type and a non-contact type. The contact type probe can be used for detecting the work pieces that the non-contact probe is not capable of detecting, such as the work pieces having characteristics such as a slope, steps, deep holes, arc and etc.

The sensing principle of the contact probes in the conventional arts mainly comprise atomic force, capacitive, fiber optic, DVD pick-up head, piezoresistor and confocal and etc. Due to requiring two to four high precision sensors, the conventional probes have problems of complex structures, installation difficulty and high costs. For instance, Eindhoven University of Netherlands developed three-dimensional micro-contact sensor probe based on strain gauge, wherein the strain gauge, circuit and the elastic components performs processes of precipitation, plate making, etching and other processes together to make the overall structure of the probe. Changes of force and displacement in all directions are detected by the strain gauge mounted on the sensitive beam. The volume is small, but the sensitivity and precision of the strain gauge are relatively low. Furthermore, the probe adopts triangular topology structure and the decoupling thereof is complicated. Swiss Federal Metrology Bureau METAS developed an electromagnetic based micro-contact probe, wherein the probe is leaf spring om on three directions, and the detections of each direction are achieved by inductance. The detecting forces are uniform on three directions, and the probe is mainly made of aluminum. The electromagnetic probe has a wide measuring range, a high sensitivity on lateral detection, a small contact force, but the structure thereof is very complex, and the installation and adjustment is difficult, and decoupling of the triangular suspension structure is complex.

SUMMARY OF THE PRESENT INVENTION

In order to avoid the shortcomings of the conventional arts mentioned above, the present invention provides a single sensor type three-dimensional micro/nano contact trigger measuring probe, so as to obtain the advantages of small size, low cost, high stability and assembling convenience, and meanwhile obtain a detection effect of high precision, high sensitivity and low stiffness.

Accordingly, in order to solve the technical problems, the present invention adopts technical solutions as follows.

A single sensor type three-dimensional micro/nano contact trigger measuring probe comprises:

a base (2) for fixedly providing the measuring probe;

a probe unit (11), comprising: a circular-ring base (11c) fixedly provided on the base (2); a leaf spring leaf spring (11b) provided on the circular-ring base (11c), wherein an end of the leaf spring (11b) is fixedly connected on the circular-ring base (11c), in such a manner that the leaf spring (11b) is supported on an up end surface of the circular-ring base (11c); a circular suspension plate (11d) is provided on a middle portion of an up surface of the leaf spring (11b); a second beam splitter prism (10) provided on a middle portion of an up surface of the circular suspension plate (11d); a wedge block (9) fixedly provided on an up surface of the second beam splitter prism (10); a stylus (11g) fixedly provided on a middle portion of a low end surface of the circular suspension plate (11d), wherein the stylus (11g) is in a "T" shape with the circular suspension plate (11d), and the stylus (11g) passes through a center through hole of the leaf spring (11b); a probe ball tip (11f) fixed on a front end of the stylus (11g); a first beam splitter prism (8) fixedly provided on the base (2), wherein the first beam splitter prism (8) is on a side of the second beam splitter prism (10) and for projecting reflected light to the second beam splitter prism (10); both the first beam splitter prism (8) and the second beam splitter prism (10) are depolarization beam splitter prism; and the probe ball tip (11f) is a rubyprobe ball tip;

a measuring unit, comprising: a laser device (4a) and a four-quadrant detector (6) fixed on the base (2); wherein collimating light emitted by the laser device (4a) is projected on the first beam splitter prism (8) and forms a first reflected light after reflected by the first beam splitter prism (8); the first reflected light passes through the second beam splitter prism (10) and forms a second reflected light; the second reflected light passes through the wedge block (9) and focuses on the four-quadrant detector (6), so as to obtain displacement and an three-dimensional angle of the second beam splitter prism (10).

The single sensor type three-dimensional micro/nano contact trigger measuring probe is characterized in that: an adjusting block (4) is provided on the base (2), the laser device (4a) is provided on the adjusting block (4), and the adjusting block (4) is used for adjusting an angle of the laser device (4a), so as to focus the laser detection signal on a detecting center of the four-quadrant detector (6).

The single sensor type three-dimensional micro/nano contact trigger measuring probe is further characterized in that: the base (2) is a hollow sleeve cylinder, a cross shelf is provided in the sleeve cylinder and divides an internal cavity of the hollow sleeve cylinder into a first cavity (2g) on an upper portion of the sleeve cylinder and a second cavity (2h) on a lower portion thereof; the adjusting block (4) is provided on the first cavity (2g); the circular-ring (11c) is fixedly provided on an opening of a bottom portion of the hollow sleeve cylinder, in such a manner that the circular suspension plate (11d), the second beam splitter prism (10), the wedge block (9) and the first beam splitter prism (8) are all in the second cavity (2h).

The single sensor type three-dimensional micro/nano contact trigger measuring probe is further characterized in that: the four-quadrant detector (6) is fixedly provided on the cross shelf via a detector supporting block (5), a sideward supporter is fixedly provided on a top surface of the detector supporting block (5); the adjusting block (4) is installed on a side of the sideward support by adjustable screws, the laser device (4a) is sleeved in the cylinder sleeve (3), wherein the cylinder sleeve (3) is fixedly connected on a side portion of the adjusting block (4), wherein the adjustable screws are a first screw (4b) and a second screw (4c) which pass through the sideward support and are respectively provided on different position if the sideward support; according to located position of the adjusting screw, through holes (2b) are provided on a sleeve side wall (2a) of the base (2); on an external portion of the hollow sleeve cylinder of the base (2), a screw-in depth of the adjustable screws on the sideward support is adjusted by passing a screwdriver through the through hole (2b), so as to adjust angles of the light from the laser device (4a) via the adjusting block (4).

Compared with the conventional arts, the present invention has beneficial effects as follows.

1. The probe of the present invention adopts four-quadrant detector for photoelectric sensing, and has a high sensitivity and position resolution, wide spectral range, small volume, fast response and wide dynamic range.

2. By utilizing only one optical sensor, the present invention is capable of sensing displacement of the detecting ball in the three-dimensional direction, the structure is simple, the installation is convenient, the cost is low and the time stability is well.

3. The present invention adopts fine adjusting blocks to adjust the posture of the laser, and the adjustment precision thereof is high, the adjustment is convenient and the stability after adjustment is high.

These and other objectives, features, and advantages of the present invention will become apparent from the following detailed description, the accompanying drawings, and the appended claims.

Reference numbers in the Figs: 1-head cover; 2-base; 2a-sleeve side wall; 2b-through hole; 2d-first threaded hole; 2e-second threaded hole; 2c-stepped hole; 2f-vertical groove; 2i-head cover screw hole; 2g-first cavity; 2h-second cavity; 3-cylinder sleeve; 4-adjusting block; 4a-laser device; 4b-first screw; 4c-second screw; 5-detector fixing block; 6-four-quadrant detector; 7-beam splitter prism fixing base; 8-first beam splitter prism; 10-second beam splitter prism; 9-wedge block; 11-probe unit; 11a-screw fixing hole; 11e-annulus base screwed hole; 11d-circular suspension plate; 11b-leaf spring ; 11c-circular-ring base; 11g-stylus; 11f-probe ball tip.

DETAILED DESCRIPTION OF THE PREFERRED EMBODIMENT

According to a preferred embodiment of the present invention, a single sensor type three-dimensional micro/nano contact trigger measuring probe comprises structures as follows.

Figure 5:
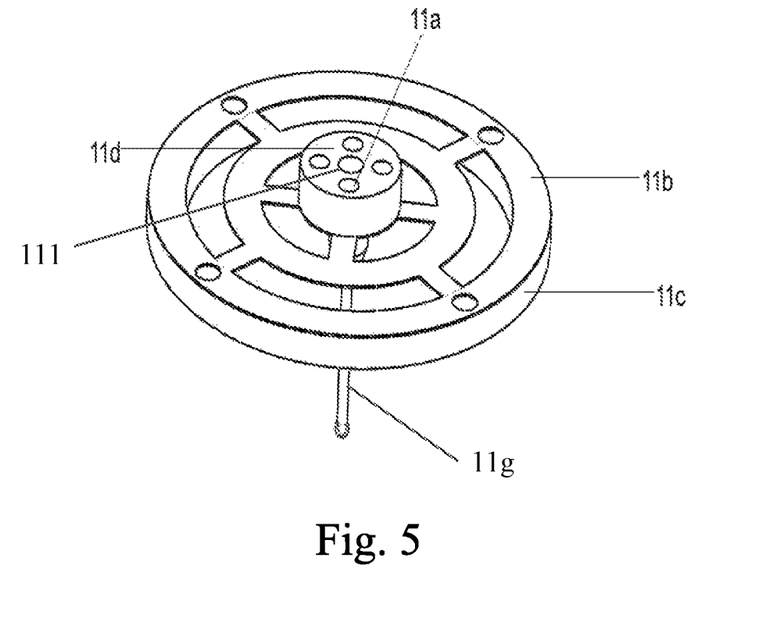
FIG. 5 is a structural sketch view of the contact trigger three-dimensional probe when the probe faces an internal side of the cylinder.
Figure 6:
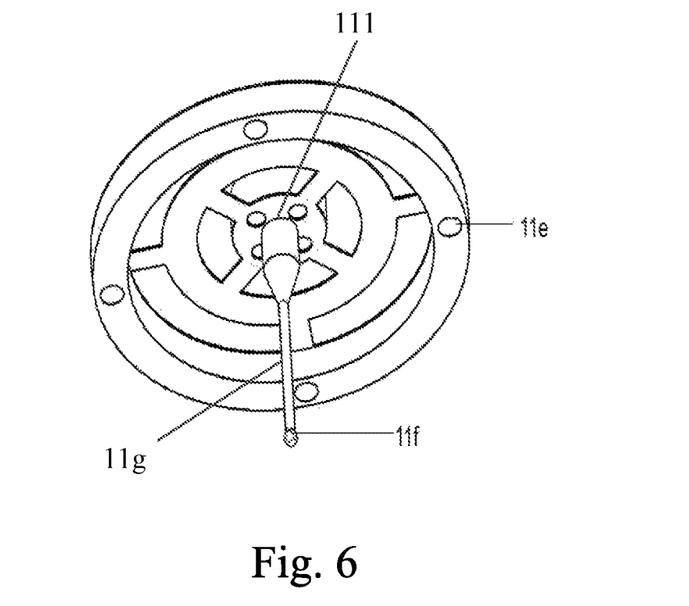
FIG. 6 is a structural sketch view of the contact trigger three-dimensional probe when the probe faces an external side of the cylinder.

As shown in FIGS. 1, 3, 5 and 6, a base 2 is used for fixedly providing the measuring probe. A probe unit 11, comprises: a circular-ring base 11c fixedly provided on the base 2; a leaf spring 11 b provided on the circular-ring base 11c, wherein an end of the leaf spring 11b is fixedly connected on the circular-ring base 11c, as shown in FIG. 6.

an annulus base screwed hole 11e provided on the circular-ring 11c is for fixedly connecting the leaf spring 11b and the circular-ring base 11c, in such a manner that the leaf spring 11b is supported on an up end surface of the circular-ring base 11c; a circular suspension plate 11d is provided on a middle portion of an up surface of the leaf spring 11b; a second beam splitter prism 10 provided on a middle portion of an up surface of the circular suspension plate 11d; a wedge block 9 fixedly provided on an up surface of the second beam splitter prism 10; a stylus 11g fixedly provided on a middle portion of a low end surface of the circular suspension plate 11d, wherein the stylus 11g is in a "T" shape with the circular suspension plate 11d, and the stylus 11g passes through the center through hole of the leaf spring 11b; a probe ball tip 11f fixed on a front end of the stylus 11g; a first beam splitter prism 8 fixedly provided on the base 2, wherein the first beam splitter prism 8 is on a side of the second beam splitter prism 10 and for projecting reflected light to the second beam splitter prism 10; both the first beam splitter prism 8 and the second beam splitter prism 10 are depolarization beam splitter prism; and the probe ball tip 11f is a ruby detecting ball. As shown in FIG. 5 and FIG. 6, both the leaf spring 11b and the circular suspension plate 11d has a center through hole and screw fixing holes 11a surrounded the center through hole. The circular suspension plate 11d is fixedly connected with the leaf spring 11b through the screw fixing holes 11a. The stylus 11g connected on the circular suspension plate 11d passes through the center through hole of the leaf spring 11b.

Figure 1:
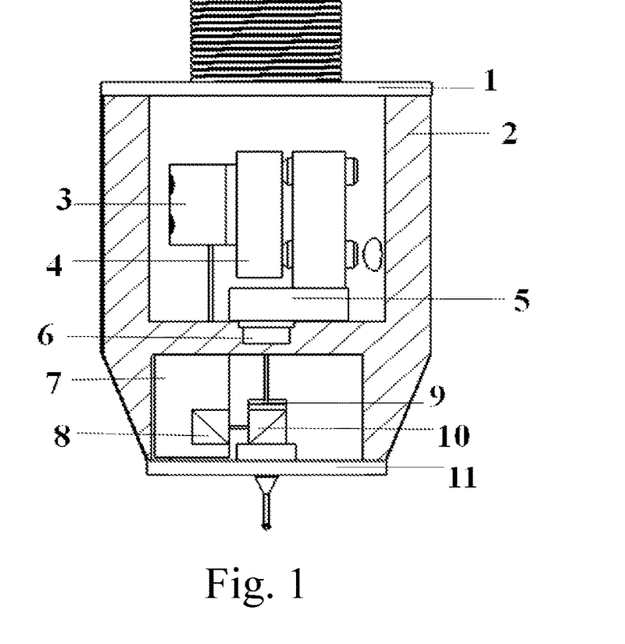
FIG. 1 is an overall structural sketch view of a contact trigger three-dimensional probe of the present invention.
Figure 2:
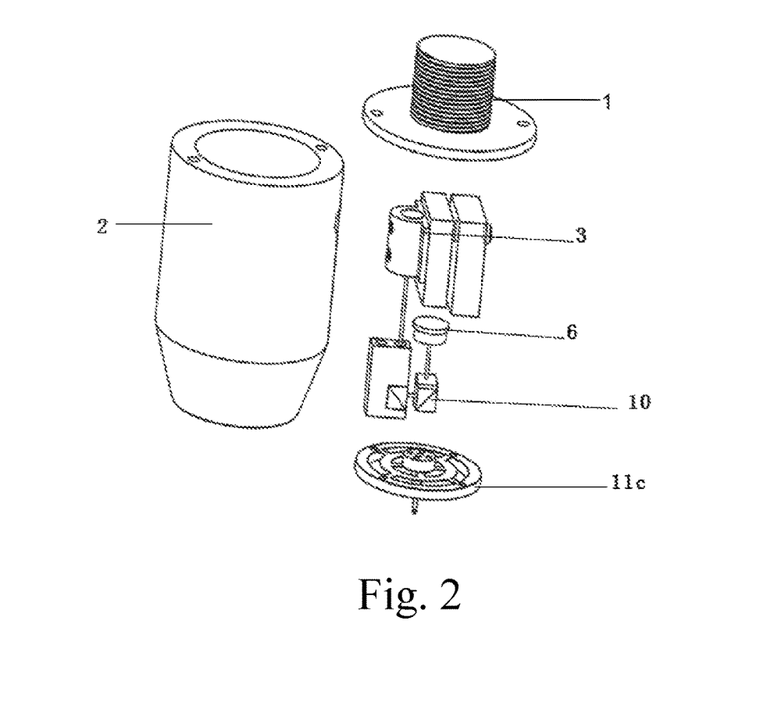
FIG. 2 is an exploded view of an overall structure of the contact trigger three-dimensional probe.
Figure 4:
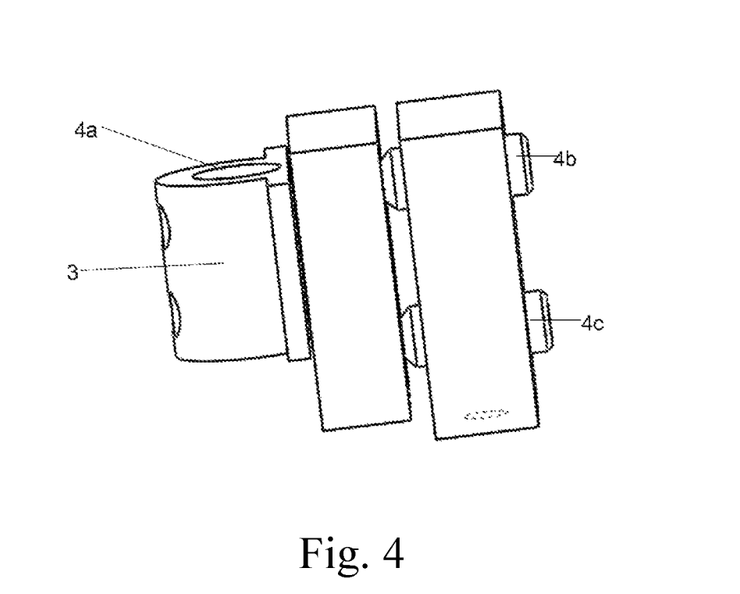
FIG. 4 is a structural sketch view of an adjusting block of the present invention.

As shown in FIGS. 1, 2 and 4, a measuring unit, comprises a laser device 4a and a four-quadrant detector 6 fixed on the base 2; wherein collimating light emitted by the laser device 4a is projected on the first beam splitter prism 8 and forms a first reflected light after reflected by the first beam splitter prism 8; the reflected light passes through the second beam splitter prism 10 and forms a second reflected light; the second reflected light passes through the wedge block 9 and focuses on the four-quadrant detector 6, so as to obtain displacement and an three-dimensional angle of the second beam splitter prism 10.

Figure 3:
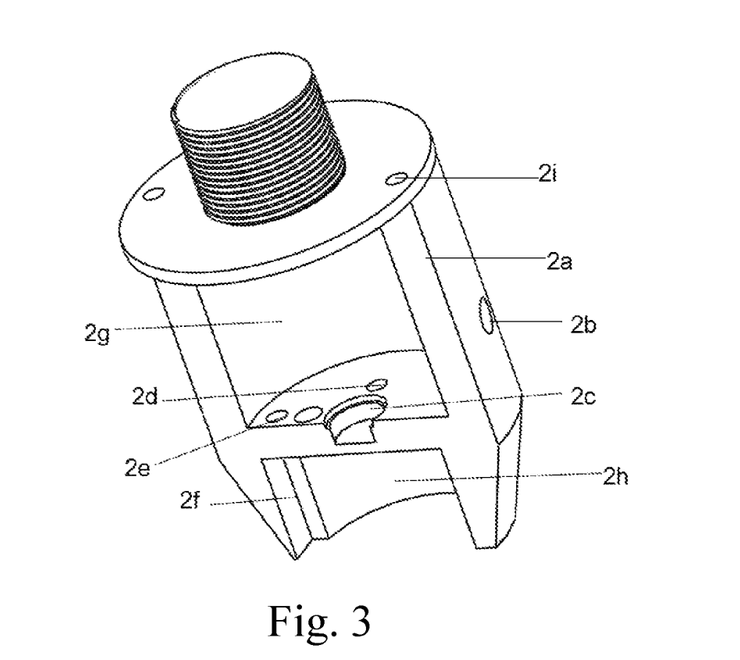
FIG. 3 is a structural sketch view of a base of the present invention.

According to a preferred embodiment of the present invention, as shown in FIGS. 1, 3 and 4, the single sensor type three-dimensional micro/nano contact trigger measuring probe comprising: an adjusting block 4 is provided on the base 2, the laser device 4a is provided on the adjusting block 4, and the adjusting block 4 is used for adjusting an angle of the laser device 4a, so as to focus the light on a detecting center of the four-quadrant detector 6.

As shown in FIGS. 2 and 3, the base 2 is a hollow sleeve cylinder, a head cover 1 is provided on a top surface of the hollow sleeve cylinder for detecting connection between the probe and elements from outside. The head cover 1 has head cover screw hole 2i for fixedly connecting the head cover 1 and the base 2. Across shelf is provided in the sleeve cylinder and divides an internal cavity of the hollow sleeve cylinder into a first cavity 2g on an upper portion of the sleeve cylinder and a second cavity 2h on a lower portion thereof; the adjusting block 4 is provided on the first cavity 2g; the circular-ring 11c is fixedly provided on an opening of a bottom portion of the hollow sleeve cylinder, in such a manner that the circular suspension plate 11d, the second beam splitter prism 10, the wedge block 9 and the first beam splitter prism 8 are all in the second cavity 2h.

Figure 7:
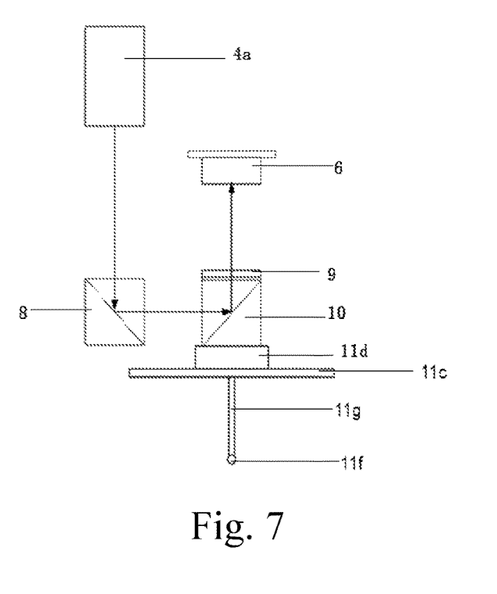
FIG. 7 is a front optical diagram of the detecting ball while being non-contacted.
Figure 10:
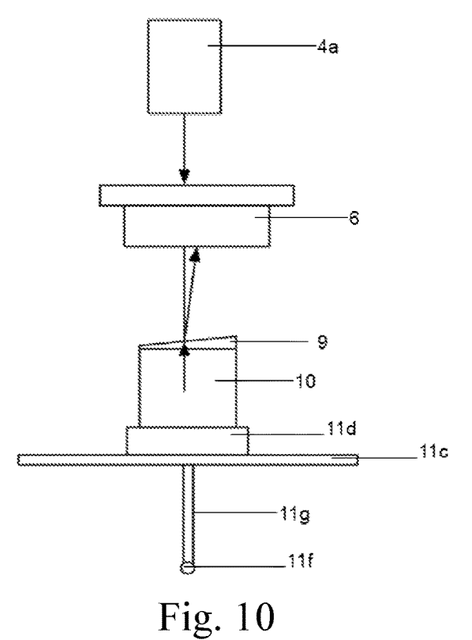
FIG. 10 is an optical diagram from a right view of the detecting ball without being contacted from any direction.

As shown in FIG. 1, in order to facilitate installation, a stepped hole 2c is provided on a center of the cross shelf of the base 2. The four-quadrant detector 6 is embedded in the stepped hole 2c to be fixed. The detector supporting block 5 for fixing the four-quadrant detector 6 is fixedly installed on the cross shelf via the first screw hole 2d on the cross shelf. A sideward supporter is fixedly provided on a top surface of the detector supporting block 5; the adjusting block 4 is installed on a side of the sideward support by adjustable screws, the laser device 4a is sleeved in the cylinder sleeve 3, wherein the cylinder sleeve 3 is fixedly connected on a side portion of the adjusting block 4, wherein the adjustable screws are a first screw 4b and a second screw 4c, which pass through the sideward support and are respectively provided on different position; according to located position of the adjustable screw, through holes 2b are provided on a cylinder side wall 2a of the base 2; on an external portion of the hollow sleeve cylinder of the base 2, a screw-in depth of the adjustable screws on the sideward support is adjusted by passing a screwdriver through the through hole 2b, so as to adjust laser exit angles of the laser device 4a via the adjusting block 4. In the second cavity of the base 2h, an vertical groove 2f is provided on a cylinder internal side wall. A beam splitter prism fixing base 7 for fixing the first beam splitter prism 8 is embedded in the vertical groove 2f for restriction. The beam splitter prism fixing base 7 is fixedly provided on the cross shelf through the second screw hole 2e in the cross shelf As shown in FIG. 7 and FIG. 10, when the probe ball tip 11f is not contacted, no deflection occurs. At the moment, light emitted from the wedge block 9 is projected on a precise center of the four-quadrant detector 6; if no light is projected on the precise center of the four-quadrant detector 6, adjust the first screw 4b and the second screw 4c, so as to regulate the laser angle of the laser device 4a until the light is projected in the precise center of the four-quadrant detector 6.

Figure 8:
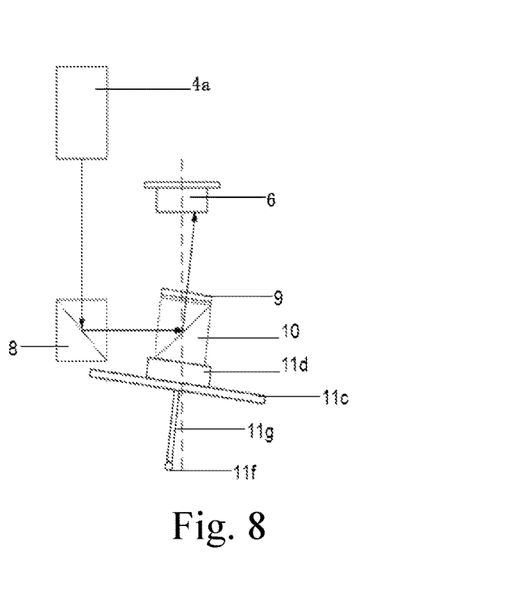
FIG. 8 is an optical diagram of the detecting ball while being contacted from a Y direction.

As shown in FIG. 8, when the probe ball tip 11f is contacted from a Y direction, the exit light has an offset in the X-axis direction, and then calculating accordingly to obtain the offset in the Y-axis direction.

Figure 9:
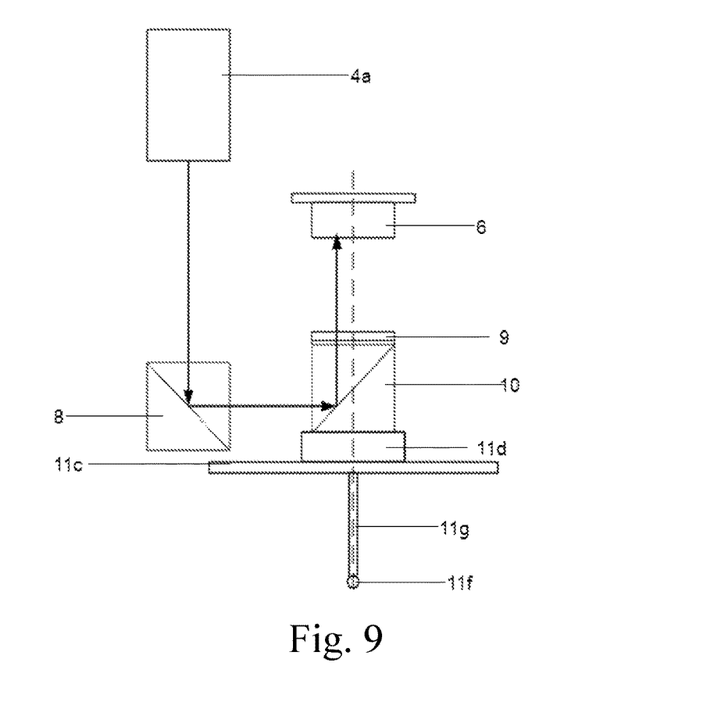
FIG. 9 is an optical diagram of the detecting ball while being contacted from a Z direction.

As shown in FIG. 9, when the probe ball tip 11f is contacted in a Z-axis direction, the four-quadrant detector 6 detects that the light emitted by the second beam splitter prism 10 and the wedge block 9 has a left offset, and the left offset displacement is detected, so as to calculate accordingly to obtain a shift distance of the probe ball tip 11f on the Z-axis direction.

Figure 11:
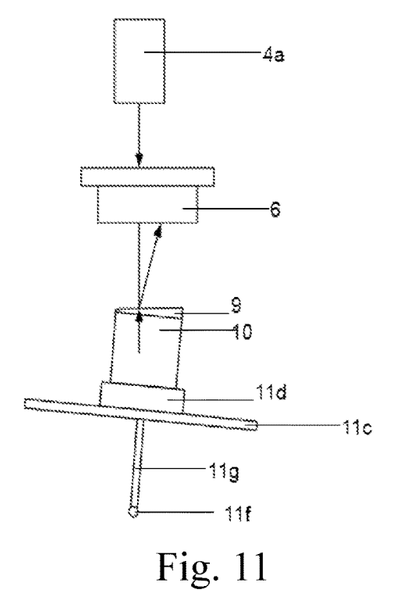
FIG. 11 is an optical diagram from a right view of the detecting ball being contacted from an X direction.

As shown in FIG. 11, when the probe ball tip 11f is contacted on the X-axis direction, light emitted from the second beam splitter prism 10 is not changed, and then has an offset on the X-axis direction after passing through the wedge block 9. The offset of the probe ball tip on the X-axis direction can be calculated and obtained by measuring the offset displacement of the light by the four-quadrant detector 6.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A single sensor type three-dimensional micro/nano contact trigger measuring probe comprising:
 a base (2) for fixedly providing the measuring probe;
 a probe unit (11), comprising: a circular-ring base (11c) fixedly provided on the base (2); a leaf spring (11b) provided on the circular-ring base (11c), wherein an end of the leaf spring (11b) is fixedly connected on the circular-ring base (11c), in such a manner that the leaf spring (11b) is supported on an up end surface of the circular-ring base (11c); a circular suspension plate (11d) is provided on a middle portion of an up surface of the leaf spring (11b); a second beam splitter prism (10) provided on a middle portion of an up surface of the circular suspension plate (11d); a wedge block (9) fixedly provided on an up surface of the second beam splitter prism (10); a detecting bar (11g) fixedly provided on a middle portion of a low end surface of the circular suspension plate (11d) , wherein the detecting bar (11g) is in a "T" shape with the circular suspension plate (11d), and the detecting bar (11g) passes through a center through hole (111) of the leaf spring (11b); a probe ball tip (11f) fixed on a front end of the detecting bar (11g); a first beam splitter prism (8) fixedly provided on the base (2), wherein the first beam splitter prism (8) is on a side of the second beam splitter prism (10) and for projecting reflected light to the second beam splitter prism (10); both the first beam splitter prism (8) and the second beam splitter prism (10) are depolarization beam splitter prism; and the probe ball tip (11f) is a ruby probe ball tip;
 a measuring unit, comprising: a laser device (4a) and a four-quadrant detector (6) fixed on the base (2); wherein collimating light emitted by the laser device (4a) is projected on the first beam splitter prism (8) and forms a first reflected light after reflected by the first beam splitter prism (8); the first reflected light passes through the second beam splitter prism (10) and forms a second reflected light; the second reflected light passes through the wedge block (9) and focuses on the four-quadrant detector (6), so as to obtain displacement and an three-dimensional angle of the second beam splitter prism (10);

wherein an adjusting block (4) is provided on the base (2), the laser device (4a) is provided on the adjusting block (4), and the adjusting block (4) is used for adjusting an angle of the laser device (4a), so as to focus the laser detection signal on a detecting center of the four-quadrant detector (6).

2. The single sensor type three-dimensional micro-nano contact trigger measuring probe, as recited in claim 1, wherein the base (2) is a hollow sleeve cylinder, a cross shelf is provided in the sleeve cylinder and divides an internal cavity of the hollow sleeve cylinder into a first cavity (2g) on an upper portion of the sleeve cylinder and a second cavity (2h) on a lower portion thereof; the adjusting block (4) is provided on the first cavity (2g); the circular-ring (11c) is fixedly provided on an opening of a bottom portion of the hollow sleeve cylinder, in such a manner that the circular suspension plate (11d), the second beam splitter prism (10), the wedge block (9) and the first beam splitter prism (8) are all in the second cavity (2h).

3. The single sensor type three-dimensional micro-nano contact trigger measuring probe, as recited in claim 2, wherein the four-quadrant detector (6) is fixedly provided on the cross shelf via a detector supporting block (5), a sideward supporter is fixedly provided on a top surface of the detector supporting block (5); the adjusting block (4) is installed on a side of the sideward support by adjustable screws, the laser device (4a) is sleeved in the cylinder sleeve (3), wherein the cylinder sleeve (3) is fixedly connected on a side portion of the adjusting block (4), wherein the adjustable screws are a first screw (4b) and a second screw (4c) which pass through the sideward support and are respectively provided on different position if the sideward support; according to located position of the adjustable screw, through holes (2b) are provided on a sleeve side wall (2a) of the base (2); on an external portion of the hollow sleeve cylinder of the base (2), a screw-in depth of the adjustable screws on the sideward support is adjusted by passing a screwdriver through the through hole (2b), so as to adjust angles of the laser device (4a) via the adjusting block (4).

\* \* \* \* \*